United States Patent [19]

Naumann et al.

[11] Patent Number: 4,985,073
[45] Date of Patent: Jan. 15, 1991

[54] NEEDLE SHAPED ALLOY POWDERS BASED ON IRON AND THEIR USE

[75] Inventors: Rolf Naumann; Jakob Rademachers, both of Krefeld; Fritz Rodi, Moers, all of Fed. Rep. of Germany

[73] Assignee: Bayer Aktiengesellschaft, Leverkusen-Bayerwerk, Fed. Rep. of Germany

[21] Appl. No.: 384,432

[22] Filed: Jul. 25, 1989

[30] Foreign Application Priority Data

Aug. 6, 1988 [DE] Fed. Rep. of Germany ....... 3826770

[51] Int. Cl.$^5$ ............................................. H01F 1/147
[52] U.S. Cl. ..................................... 75/255; 106/404; 420/103
[58] Field of Search ............... 106/407, 454, 457, 459, 106/461; 420/103; 148/105; 75/251, 255

[56] References Cited

U.S. PATENT DOCUMENTS 4,014,710 3/1977 Woditsch et al. ................... 106/457
4,229,234 10/1980 Krutbnat et al. ................... 148/105

OTHER PUBLICATIONS

"Angewandte Chemie", vol. 92, pp. 187-194 (1980).

Primary Examiner—Theodore Morris
Assistant Examiner—George Wyszomierski
Attorney, Agent, or Firm—Connolly and Hutz

[57] ABSTRACT

Needle shaped alloy pigment powders consisting essentially of iron, silicon and aluminum, with up to 1.0% by weight of chromium and one or both of cobalt or tin in amounts from 0.3 to 3% by weight of cobalt and from 0.1 to 5.0% by weight of tin, based in each case on the iron, are useful as the magnetic powders used in magnetic recording devices.

4 Claims, No Drawings

NEEDLE SHAPED ALLOY POWDERS BASED ON IRON AND THEIR USE

The present invention relates to needle shaped alloy powders in the form of pigments consisting substantially of iron and containing silicon and aluminium, to a process for their preparation and to their use.

BACKGROUND OF THE INVENTION

With the development of miniaturization of electronic parts, entertainment electronics and computers, magnetic information stores are increasingly required to have higher storage densities. This can only be achieved by increasing the fineness of sub-division and the coercive force of the magnetic powders used for producing the magnetic recording carriers.

According to Ullmanns Encyklopadie der technischen Chemie, Volume 16, 4th Edition, 1979, pages 361 to 367, needle shaped particles of $\gamma$-$Fe_2O_3$, cobalt-modified $\gamma$-$Fe_2O_3$, $Fe_3O_4$, Co-modified $Fe_3O_4$, $CrO_2$ and iron alloys are used for this purpose and the coercive forces obtainable with iron oxides, cobalt-modified iron oxides and $CrO_2$ under technically practicable marginal conditions have their upper limit at about 80 kA m$^{-1}$. A marked increase in the coercive forces can only be obtained with particles of iron alloys.

Extremely finely divided iron alloys with high coercive forces are used for this purpose; the profile of their requirements may be found in DE-A 3 226 937, FIG. 3.

According to DE-A 2 014 500, these powders may be prepared by isomorphic reduction of suitable starting compounds. This procedure, however, entails considerable difficulties. Thus when goethite is used as starting material, complete destruction of the desired needle shape may occur so that only insufficient coercive forces are obtained. Further, severe sintering is observed due to the fine state of subdivision, and this again results in inadequate products. Another problem lies in the pyrophoricity of the reduced alloy powders, which must be eliminated by additional measures such as surface oxidation of the particles, after-treatment or combinations of these procedures. This step is also necessary for suppressing the damage to the properties of the resulting magnetic recording carriers by corrosion.

Various attempts have been made to solve this problem. In DE-A 2 553 635, for example, the goethite compound used as starting material is covered with tin oxide and titanium oxide and products having an average needle length of from 0.3 to 1 μm are obtained. According to DE-A 2 212 934, the precursor compound is coated with Co ions and/or Ni ions. Lastly, EP-A 056 257 discloses a process in which the precursor compound is treated with silicon dioxide and aluminium oxide.

The best values for coercivity are obtained from precursor compounds doped with nickel but these pigments are not ecologically harmless.

It is an object of the present invention to provide suitable alloy powders which are free from the above described disadvantages.

BRIEF DESCRIPTION OF THE INVENTION

These requirements are fulfilled to an excellent degree by needle shaped alloy powders in the form of pigments consisting substantially of iron and containing silicon and aluminium and having a cobalt content of from 0.3 to 3% by weight and/or a tin content of from 0.1 to 5.0% by weight, based in each case on the iron.

DETAILED DESCRIPTION OF THE INVENTION

The present invention relates to needle shaped alloy pigment powders and a process for manufacture of such powders. The needle shaped alloy pigment powders of this invention consist essentially of iron, silicon and aluminum with up to 1% by weight of chromium and one or both of cobalt or tin in amounts from 0.3 to 3% by weight of cobalt and from 0.1 to 5% by weight of tin, based in each case on the iron.

It was found that both the $SiO_2/Al_2O_3$ ratio of the protection applied against sintering and the additional metal oxide applied were of decisive influence on the properties of the end product.

The desired properties of the products could only be obtained if in addition to the after-treatment with silicon and aluminium in a ratio by weight of $SiO_2/Al_2O_3 \geq 1$, another metal compound of cobalt or tin was applied. The addition of other metal compounds did not lead to the desired high coercive forces.

Particularly advantageous results are obtained with alloy powders according to the invention having a silicon content of from 1.5 to 3.5% by weight. The aluminium content is preferably in the range of from 1 to 4.5% by weight.

The alloy powders according to the invention are characterised by a concentration of the alloying elements in the shell of more than 2:1 and silicon is found to be concentrated to the greatest degree.

The alloy powders according to the invention have coercive forces of at least 115 kAm$^{-1}$ and are therefore eminently suitable for the preparation of magnetic recording media. The presence of chromium as alloying pigment provides a further increase in the coercive force. Alloy powders according to the invention having a chromium content of from 0.01 to 1.0% by weight are particularly preferred.

The magnetic values were determined on the triturated magnetic powders in a measuring field of 397.89 kA m$^{-1}$.

The fineness of the alloy powders according to the invention should have very high values in terms of the specific surface area according to BET and low values in terms of the X-ray is a good reflex since this radiographic crystallite size is a good approximation of the measure of the diameter of the metal core of the alloy needles coated with oxides.

The specific surface areas of the goethite precursors and of the end products were obtained by the one point BET (Brunauer, Emmett and Teller) process (literature: S. J. Gregg, K. S. W. Sing: Adsorption, Surface Area and Porosity; London, New York, 1967, chapters 2 and 8; and F. M. Nelson, F. T. Egertsen: Analyt. Chem. 30 (1958), 1987) in a stream of $N_2$/He mixture and integrating determination of the change in concentration in the stream of nitrogen discharged. The precursor compounds were measured after one hour's heating at 140° C. in the dry stream of nitrogen and the end products were measured in the state delivered.

The X-ray of the precursor compounds and of the alloy powders which had been oxidized on the surface were determined at the 110 reflex both on the goethite and on the end products by the method described in "X-ray Diffraction Procedures" by H. P. Klug and L. E. Alexander (1974), publishers Wiley, N.Y.

The crystallite size of the alloY powders according to the invention is preferably at the most 16 nm of the Fe-D 110 reflex. The powders Preferably have a specific surface area according to BET of at least 45 m²/g.

This invention also relates to a process for the preparation of the alloy powders according to the invention. They are preferably obtained by reduction of the corresponding oxidic iron oxide precursor compounds with precipitation of the alloying elements on the precursor compound.

The addition of chromium in the preparation of precursor compounds resulted in a marked improvement in the reproducibility of the precursor compound without damaging the other properties.

When alloy powders according to the invention are doped with chromium, the chromium should be present as dopant in the precursor compound. Precursor compounds in the context of this invention are all needle-shaped iron oxides or oxide hydroxides. Particularly good results are obtained when the starting compound is converted into a $Fe_3O_{4+x}$ mixed phase in which $0 < x < 1$ before the reduction.

In another preferred embodiment of the process according to the invention, at least part of the cobalt and-/or tin and/or aluminium is deposited on the precursor compound.

It may also be advantageous to coat the alloy powder according to the invention obtained after the reduction with a skin of oxide on its surface by bringing it into contact with gases containing oxygen. This results in good passivation of the alloy powders according to the invention.

The present invention further relates to the use of the alloy powders according to the invention for the preparation of magnetic recording carriers.

The invention is described below by way of example which should not be regarded as implying any limitation.

EXAMPLE 1

173 liters of a solution of 15 kg of iron sulphate and 166.6 g of $SnCl_2.2H_2O$ in water were reacted at 18° C., with stirring, with 150 liters of a solution containing 30 kg of sodium hydroxide and the reaction mixture was gassed with 0.66 m³/h of air at 25° C. After oxidation of the iron-II compounds, 5 liters of a solution containing 263 g of $CoSO_4 \times 7H_2O$ were added dropwise and the mixture was stirred for 30 minutes. The suspension was then filtered off and the filter cake was washed with completely salt free water. After redispersion of the filter cake in water, a solution of sodium water glass (=3% by weight of $SiO_2$/FeOOH) followed by a solution of $Al_2(SO_4)_3$ (=1.5% by weight of $Al_2O_3$/FeOOH) were added at 80° C. with stirring. After a further 30 minutes of stirring, the pH was adjusted to 5 with dilute sodium hydroxide solution. After filtration, washing and drying, the filter cake was broken up and converted into $Fe_3O_4$ under the following conditions:

30 minutes tempering at 650° C. in air,
105 minutes reduction with $H_2/H_2O$ mixture to $Fe_3O_4$ at 400° C.,
30 minutes FeO adjustment with $N_2$/air at 80° C. to 20–25% by weight FeO/original weight,
30 minutes after-tempering under nitrogen at 650° C.

600 g of the material thus obtained are reduced to the metal in a stream of hydrogen at 425° C. within 5 hours.

When the product is cold, the surface of the particles is oxidized in the stream of nitrogen/air with increasing proportions of air. The resulting powder was found to have the following properties:

coercive force: 122.5 $kAm^{-1}$
Br/Bs: 0.505
Packing density in the magnetic tube: 0.61 g/ml
$S_{BET}$: 58 m²/g
$D_{110}$: 12.5 nm.

EXAMPLE 2

51.5 m³ of a solution containing 7,750 kg of sodium hydroxide were introduced at 17.9° C. into a stirrer vessel of 100 m³ capacity and 49.2 m² of a solution containing 4,550 kg of $FeSO_4$ were pumped in within 37 minutes at 18.8° C. while stirring After all the solution containing $FeSO_4$ had been pumped in, the suspension was gassed with 150 m³/h of air while stirring The oxidation reaction was completed after 630 minutes.

$CoSO_4$ solution was added dropwise (1% by weight Co/Fe) to 7 m³ of this suspension in 30 minutes with stirring and the mixture was stirred for a further 30 minutes. After filtration, washing and redispersion, the product was after-treated with 3% by weight of $SiO_2$/-FeOOH and 1.5% of $Al_2O_3$/-FeOOH as in Example 1. Working up of the product, conversion and reduction to the metal were carried out as in Example 1. After oxidation of the surface, the powder was found to have the following properties:

| | |
|---|---|
| coercive force | 126.3 $kAm^{-1}$ |
| Br/Bs | 0.55 |
| Packing density in the magnetic tube | 0.54 g/ml |
| $S_{BET}$ | 63 m²/g |
| $D_{110}$ | 13 nm |

EXAMPLE 3

150 liters of a solution containing 25 kg of NaOH were introduced at 18° C. into a stirrer vessel equipped with a disc stirrer and cooling jacket and 173 liters of a solution of 15 kg of $FeSO_4$ and 158.77 g of $KCr(SO_4).12H_2O$ were pumped in within 30 minutes with stirring and inertisation. Oxidation was then carried out with 1.5 m³/h of air at 25° C. After termination of the oxidation reaction, 5 liters of a $CoSO_4$ solution (2% by weight Co/Fe) were added dropwise and the reaction mixture was stirred for a further 30 minutes.

Following an after-treatment with 3% of $SiO_2$/-FeOOH and 1.5% of $Al_2O_3$/FeOOH, the product was worked up into the surface oxidized metal powder as described in Example 1.

The end product was found to have the following properties:

| | |
|---|---|
| coercive force | 129.9 $kAm^{-1}$ |
| Br/Bs | 0.507 |
| packing density in the magnetic tube | 0.594 g/ml |
| | 0.594 g/ml |
| $S_{BET}$ | 62 m²/g |
| $D_{110}$ | 14 nm. |

EXAMPLE 4

4 m³ of a solution containing 840 kg of NaOH were introduced at 20° C. into a stirrer vessel equipped with disc stirrer and cooling jacket and 3 m³ of a solution containing 546 kg of FeSO4 (prepared from commercial iron sulphate heptahydrate from pickling stations and clarified river water) to which 0.3% by weight of Cr/Fe in the form of KCr(SO4)2. 12H2O and 1% by weight of Co/Fe in the form of CoSO4.7H2O had been added were pumped in with cooling and stirring and inertisation over a period of 23 minutes. When all of this solution has been pumped in, the reaction mixture was gassed with 30 m³/h of air at 25° C.

After termination of the oxidation reaction, the material was filtered off and washed. After redispersion, an after-treatment was carried out at 80° C. with:

1% by weight of Sn (in the form of a solution of SnCL2) and

3% by weight of SiO2 (in the form of a soda water glass solution) and 0.5% by weight of Al2O3 (in the form of a solution of Al2(SO4)3), based in each case on the quantity of α-FeOOH put into the process, the pH being finally adjusted to 5.

Further working up to the surface oxidized metal powder was carried out as described in Example 1. The end product has the following properties:

| coercive force | 128.7 kAm$^{-1}$ |
|---|---|
| Br/Bs | 0.523 |
| packing desnity in the magnetic tube | 0.597 g/ml |
| $S_{BET}$ | 53 m²/g |
| $D_{110}$ | 15.5 nm |

COMPARISON EXAMPLE 1

The precursor compound from Example 4 is after-treated at 80° C. with 2% by weight of Sn/FeOOH, 1% by weight of SiO2/-FeOOH and 3% by weight of Al2O3/FeOOH and the pH is subsequently adjusted to 5 wIth sodIum hydroxide solution. Working up of the product to the surface oxidized metal powder was carried out as described in Example 1.

The metal powder was found to have the following properties:

| coercive force | 91 kAm$^{-1}$ |
|---|---|
| Br/Bs | 0.418 |
| packing density in the magnetic tube | 0.885 g/ml |
| $S_{BET}$ | 48 m²/g |
| $D_{110}$ | 16.5 nm |

COMPARISON EXAMPLE 2

The α-FeOOH precursor compound from Example 4 was after-treated with 2% by weight of Sn/FeOOH and 5% by weight of Al2O3 and worked up as in Example 1. The end product was found to have the following properties:

| coercive force | 69.9 kAm$^{-1}$ |
|---|---|
| Br/Bs | 0.426 |
| packing density in the magnetic tube | 0.79 g/ml |
| $S_{BET}$ | 45 m²/g |
| $D_{110}$ | 17 nm |

COMPARISON EXAMPLE 3

200 liters of sodium hydroxide solution containing 52 kg of NaOH and 150 liters of a solution of iron sulphate heptahydrate and tin-II chloride containing 27.3 kg of FeSO4 and 190 g of SnCl2.2H2O were mixed at room temperature with inertisation in a stirrer vessel equipped with disc stirrer and the mixture was then gassed with 2 m³/h at 25° C. After termination of the oxidation reaction, the solid substance was filtered off and redispersed in water. An after-treatment was carried out at 80° C. with 3% by weight of SiO2/solids content in the form of a water glass solution having an SiO2 content of 360 g/l and 0.5% by weight of Al2O3/-solids content in the form of an aluminium sulphate solution.

The pH was finally adjusted to 5.0 with dilute sulphuric acid.

After filtration and washing, the after-treated goethite was worked up into the surface oxidized metal pigment as described in Example 1.

| coercive force | 112.4 kAm$^{-1}$ |
|---|---|
| Br/Bs | 0.456 |
| packing density in the magnetic tube | 0.527 g/ml |
| $S_{BET}$ | 37 m²/g |
| $D_{110}$ | 18 nm |

COMPARISON EXAMPLE 4

3,475 liters of a solution of 469 kg of NaOH in water at a temperature of 14° C. are mixed with 2044 liters of an iron-II sulphate solution containing 404.7 kg of FeSO4 over a period of 39 minutes with inertisation and the mixture is then gassed with 150 m³/h of air. After oxidation of the $Fe^{2+}$, the goethite formed is filtered off and washed. After redispersion, 1% by weight of Co/-solids content and 4% by weight of SiO2/solids content are deposited by precipitation at 80° C.

After filtration and washing, the product is worked up into the surface oxidized Fe pigment as described in Example 1.

| coercive force | 113 kAm$^{-1}$ |
|---|---|
| Br/Bs | 0.51 |
| packing density in the magnetic tube | 0.667 g/ml |
| $S_{BET}$ | 42 m²/g |
| $D_{110}$ | 16 nm |

In Table 1, the goethites used as starting material are characterised by their specific surface areas and X-ray.

Table 2 gives the results of the tests carried out on the metal powders after their incorporation in magnetic tapes. The same basic formulation of binder was used in all cases, only the quantities of dispersing agents added were adapted to the degree of sub-division of the pigments. The magnetostatics of the tapes were again measured in a measuring field of 397.89 kAm$^{-1}$:

(a) the Br/Bs value is the quotient of:

$$\frac{\text{remanent tape flux}}{\text{saturation tape flux}}$$

(b) the OR value is the quotient of:

$$\frac{\text{magnetisation in the longitudinal direction of the tape}}{\text{magnetisation transversely to the direction of the tape}}$$

(c) the (l-s*) value is used as a measure of the distribution of coercive force and is determined by the method of Williams and Comstock.

TABLE 1

Characterisation of the starting compounds.

| | $S_{BET}$ (m²/g) | $D_{110}$ (A/nm) |
|---|---|---|
| Example | | |
| 1 | 88 | 75/7.5 |
| 2 | 77 | 90/9.0 |
| 3 | 89 | 85/8.5 |
| 4 | 72 | 85/8.5 |
| Comparison Examples | | |
| 1 | 72 | 85/8.5 |
| 2 | 72 | 85/8.5 |
| 3 | 81 | 95/9.5 |
| 4 | 73 | 95/9.5 |

TABLE 2

Magnetic tapes obtained from the powder samples

| Sample | Coercive force (kAm⁻¹) | Br/Bs | OR | 1-s* |
|---|---|---|---|---|
| Example 1 | 120.2 | 0.88 | 3.02 | 0.28 |
| Example 2 | 121.0 | 0.87 | 2.77 | 0.28 |
| Comparison Example 3 | 113.3 | 0.81 | 2.19 | 0.29 |
| Comparison Example 4 | 111.2 | 0.76 | 1.52 | 0.37 |

What is claimed is:

1. Needle shaped alloy pigment powders consisting essentially of iron, 1.5 to 3.5% by weight silicon and 1 to 4.5% by weight aluminum, with up to 1.0% by weight of chromium and one or both of cobalt or tin in amounts from 0.3 to 3% by weight of cobalt and from 0.1 to 5.0% by weight of tin, based in each case on the iron, and having a specific surface area according to the one point BET process of at least 45 m²/g.

2. Alloy pigment powders according to claim 1 wherein the elements Si, Al, Co, Sn and Cr alloying with iron are concentrated in the outer shell of the powder particles to an extent of more than 2:1.

3. Alloy powders according to claim 1 wherein the chromium content is from 0.01 to 1.0% by weight.

4. In an improved magnetic recording device which contains magnetic powders as the magnetic recording means, the improvement comprising said powder being needle shaped alloy pigment particles consisting essentially of iron, 1.5 to 3.5% by weight silicon and 1 to 4.5% by weight aluminum, with up to 1.0% by weight of chromium and one or both of cobalt or tin in amounts from 0.3 to 3% by weight of cobalt and from 0.1 to 5.0% by weight of tin, based in each case on the iron.

* * * * *